US011562142B2

United States Patent
Nijkamp et al.

(10) Patent No.: US 11,562,142 B2
(45) Date of Patent: Jan. 24, 2023

(54) NEURAL NETWORK BASED REPRESENTATION LEARNING FOR NATURAL LANGUAGE PROCESSING

(71) Applicant: salesforce.com, inc., San Francisco, CA (US)

(72) Inventors: Erik Lennart Nijkamp, Los Angeles, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 46 days.

(21) Appl. No.: 17/187,608

(22) Filed: Feb. 26, 2021

(65) Prior Publication Data

US 2022/0277141 A1    Sep. 1, 2022

(51) Int. Cl.
*G06F 40/279*    (2020.01)
*G06F 40/58*    (2020.01)

(52) U.S. Cl.
CPC ............ *G06F 40/279* (2020.01); *G06F 40/58* (2020.01)

(58) Field of Classification Search
CPC ............................... G06F 40/279; G06F 40/58
USPC ............................................................ 704/9
See application file for complete search history.

(56) References Cited

PUBLICATIONS

Brown, T.B. et al., "Language Models are Few-Shot Learners," arXiv:2005.14165v4, Jul. 22, 2020, pp. 1-75.
Clark, K. et al., "ELECTRA: Pre-training Text Encoders as Discriminators Rather Than Generators," arXiv:2003.10555, Mar. 23, 2020, pp. 1-18.
Devlin, J. et al., "BERT: Pre-training of Deep Bidirectional Transformers for Language Understanding," arXiv:1810.04805, May 24, 2019, pp. 1-16.
Gokaslan, A. et al., "OpenWebText Corpus," 2019, two pages, [Online] [Retrieved on Mar. 2, 2021] Retrieved from the Internet <URL: https://skylion007.github.io/OpenWebTextCorpus/>.
Jang, E. et al., "Categorical Reparameterization with Gumbel-Softmax," arXiv:1611.01144v5, Aug. 5, 2017, pp. 1-13.
Jiao, X. et al., "TinyBERT: Distilling BERT for Natural Language Understanding," arXiv:1909.10351v5, Oct. 16, 2020, pp. 1-12.
Joshi, M. et al., "SpanBERT: Improving Pre-training by Representing and Predicting Spans," arXiv:1907.10529v3, Jan. 18, 2020, pp. 1-13.
Lan, Z. et al., "ALBERT: A Lite BERT for Self-supervised Learning of Language Representations," arXiv:1909.11942v6, Feb. 9, 2020, pp. 1-17.
Lewis, M. et al., "BART: Denoising Sequence-to-Sequence Pre-training for Natural Language Generation, Translation, and Comprehension," arXiv:1910.13461v1, Oct. 29, 2019, pp. 1-10.

(Continued)

*Primary Examiner* — Thierry L Pham
(74) *Attorney, Agent, or Firm* — Fenwick & West LLP (57) ABSTRACT

A machine learning based model generates a feature representation of a text sequence, for example, a natural language sentence or phrase. The system trains the machine learning based model by receiving an input text sequence and perturbing the input text sequence by masking a subset of tokens. The machine learning based model is used to predict the masked tokens. A predicted text sequence is generated based on the predictions of the masked tokens. The system processes the predicted text sequence using the machine learning based model to determine whether a token was predicted or an original token. The parameters of the machine learning based model are adjusted to minimize an aggregate loss based on prediction of the correct word for a masked token and a classification of a word as original or replaced.

20 Claims, 9 Drawing Sheets

(56) References Cited

PUBLICATIONS

Lewis, M. et al., "Pre-training via Paraphrasing," 34th Conference on Neural Information Processing Systems (NeurIPS 2020), Dec. 2020, pp. 1-12.

Liu, Y. et al., "RoBERTa: A Robustly Optimized BERT Pretraining Approach," arXiv:1907.11692v1, Jul. 26, 2019, pp.

Radford, A. et al., "Improving Language Understanding by Generative Pre-Training," OpenAI, Jun. 11, 2018, pp. 1-12.

Radford, A. et al., "Language Models are Unsupervised Multitask Learners," OpenAI, Feb. 14, 2019, pp. 1-24.

Raffel, C. et al., "Exploring the Limits of Transfer Learning with a Unified Text-to-Text Transformer," Journal of Machine Learning Research, vol. 21, Jun. 2020, pp. 1-67.

Rajpurkar, P. et al., "SQuAD: 100,000+ Questions for Machine Comprehension of Text," arXiv:1606.05250v3, Oct. 11, 2016, pp. 1-10.

Salazar, J. et al., "Masked Language Model Scoring," arXiv:1910.14659v2, Jan. 1, 2021, pp. 1-14.

Shin, J. et al., "Effective Sentence Scoring Method Using BERT for Speech Recognition," Proceedings of The Eleventh Asian Conference on Machine Learning, PMLR 101, May 2019, pp. 1081-1093.

Vincent, P. et al., "Extracting and composing robust features with denoising autoencoders," ICML '08: Proceedings of the 25th international conference on Machine learning, Jul. 2008, pp. 1096-1103.

Wang, A. et al., "GLUE: A Multi-Task Benchmark and Analysis Platform for Natural Language Understanding," arXiv:1804.07461v3, Feb. 22, 2019, pp. 1-20.

Yang, Z. et al., "XLNet: Generalized Autoregressive Pretraining for Language Understanding," 33rd Conference on Neural Information Processing Systems (NeurIPS 2019), Dec. 2019, pp. 1-11.

NEURAL NETWORK BASED REPRESENTATION LEARNING FOR NATURAL LANGUAGE PROCESSING

BACKGROUND

Field of Art

The disclosure relates in general to machine learning based models, and more specifically to training of a machine learning based model for representation learning of data, for example natural language text.

Description of the Related Art

Machine learning systems use feature engineering as preprocessing to build feature representations from raw data, for example, natural language text. The feature representations generated by a machine learning based model are provided as input to other machine learning based systems, for example, to perform prediction or classification. Deep learning techniques may be used for representation learning for natural language processing. Deep learning based feature engineering needs careful design and considerable expertise. A specific task, for example, natural language processing requires customized feature engineering techniques. This makes representation learning labor intensive, time consuming, and inflexible. Furthermore, conventional techniques for training deep learning models require significant computational resources.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

DETAILED DESCRIPTION

A machine learning based model generates a feature representation of a text sequence, for example, a natural language sentence or phrase. The system trains the machine learning based model using a training dataset comprising text sequences. The training of the machine learning based model using a text sequence includes a generator phase and a discriminator phase. In the generator phase, the system perturbs the input text sequence by randomly masking a selected subset of tokens of the input text sequence. The machine learning based model is used to predict the masked tokens. A predicted text sequence is generated based on the predictions. In the discriminator phase the system processes the predicted text sequence using the same machine learning based model to determine whether a token was predicted in the generator phase or an original token of the input text sequence. The parameters of the machine learning based model are adjusted to minimize an aggregate loss obtained by combining a loss based on the generator phase with a loss based on the discriminator phase. The machine learning based model has improved compute and sample efficiency in pretraining, provides enhanced representations, and outperforms strong baselines in fine-tuning on downstream tasks.

System Environment

Figure 1:
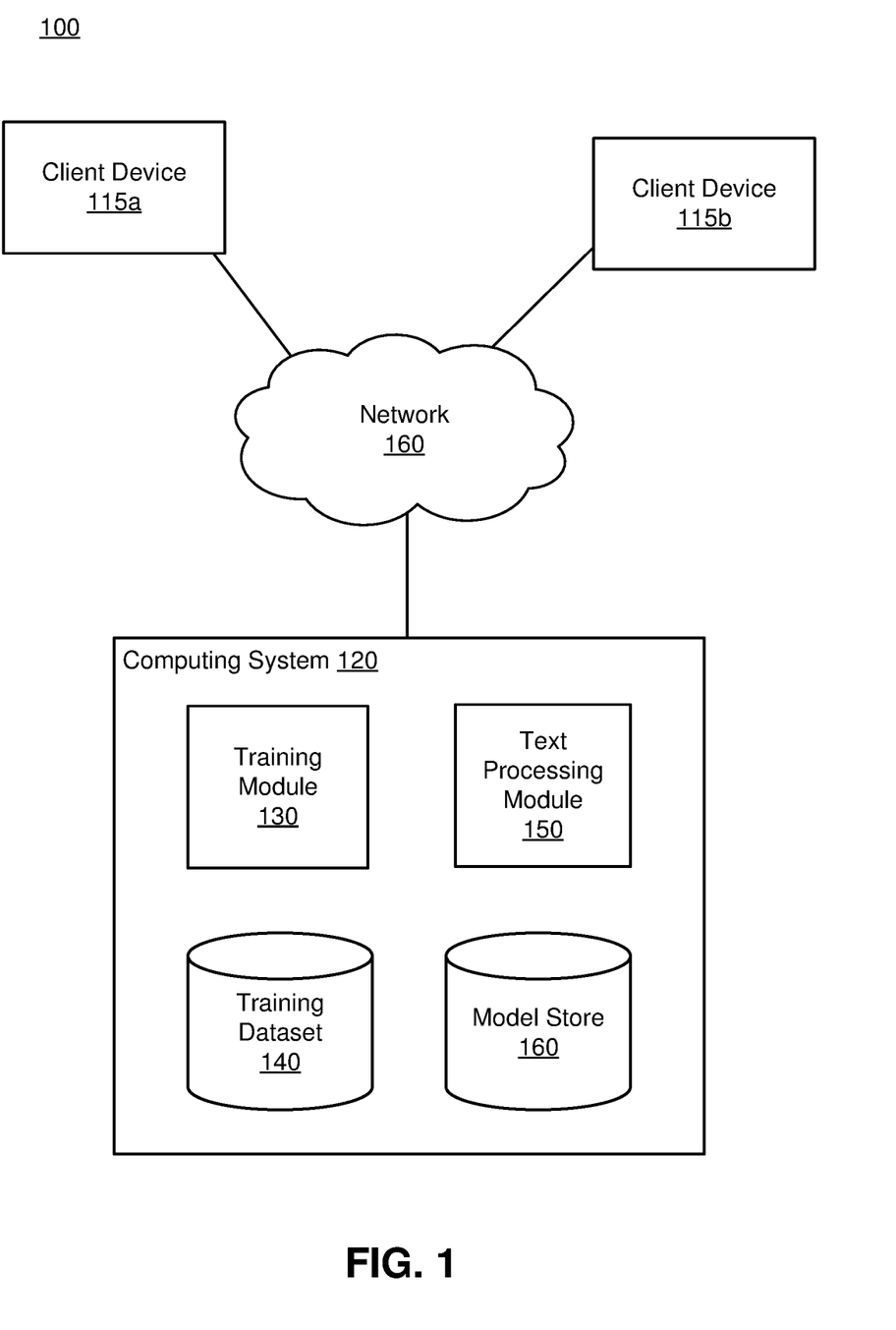
FIG. 1 is a block diagram of a system environment for training of machine learning models, according to one embodiment.

FIG. 1 is a block diagram of a system environment 100 for training of machine learning models, according to one embodiment. The system environment 100 includes a computing system 120 and one or more client devices 115 that interact with the computing system 120 via a network 170.

The computing system 120 includes a training module 130, a training dataset 140, a text processing module 150, and a model store 160. The model store 160 stores machine learning based models, for example, neural networks used for representation learning. Each machine learning based model comprises a set of parameters that are adjusted by performing a training process. In an embodiment, the machine learning based model is a transformer encoder model configured to process data such as text and generate a feature representation of the input data, for example, a feature vector.

The training dataset 140 comprises examples of data used for training machine learning based models stored in the model store 160. For example, if the model being trained processes natural language text, the training dataset includes text sequences that represent natural language sentences or phrases.

The training module 130 uses examples of data stored in the training dataset 140 for training the machine learning based models stored in the model store 160. In an embodiment, the training module 130 provides an example input text sequence to a machine learning model to determine a predicted output. The training module 130 determines an expected output based on the example input. The training module 130 compares the predicted output with the expected output to determine a loss value indicative of the difference between the predicted output and the expected output. The training module 130 adjusts the parameters of the machine learning based models to minimize the loss value, for example, using gradient descent technique. Details of the training process are further described herein.

The text processing module 150 uses the machine learning based models stored in the model store 160 to perform various text processing tasks. The text processing module 150 uses a transformer encoder model to generate a feature representation of an input text sequence and uses the feature representation to perform a text processing task. Examples of text processing tasks performed by the text processing module include sentiment analysis of natural language sentences, performing conversation with a user, for example, using an online chatbot, performing entity recognition in sentences, performing sentence similarity by comparing two sentences, and so on.

The computing system 120 may include other components not shown in FIG. 1, for example, various applications, other types of data stores, and so on. The system environment 100 may include other elements not shown in FIG. 1, for example, a load balancer. In an embodiment, the computing system 120 is an online system that interacts with client devices via networks. The computing system 120 is not required to be an online system and can execute the processes disclosed herein in an offline mode.

The computing system 120 and client devices 115 shown in FIG. 1 represent computing devices. A computing device can be a conventional computer system executing, for example, a Microsoft™ Windows™-compatible operating system (OS), Apple™ OS X, and/or a Linux OS. A computing device can also be a device such as a personal digital assistant (PDA), mobile telephone, video game system, etc.

The client devices 115 may interact with the computing system 120 via the network 170. The network 170 uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

The client devices 115 may be used to provide training dataset to the computing system 120 or to provide instructions, for example, commands for training the machine learning based model. A trained machine learning based model may be executed by the computing system 120, or provided to other computing systems for example, client devices 115 or other external systems.

System Architecture

Figure 2:
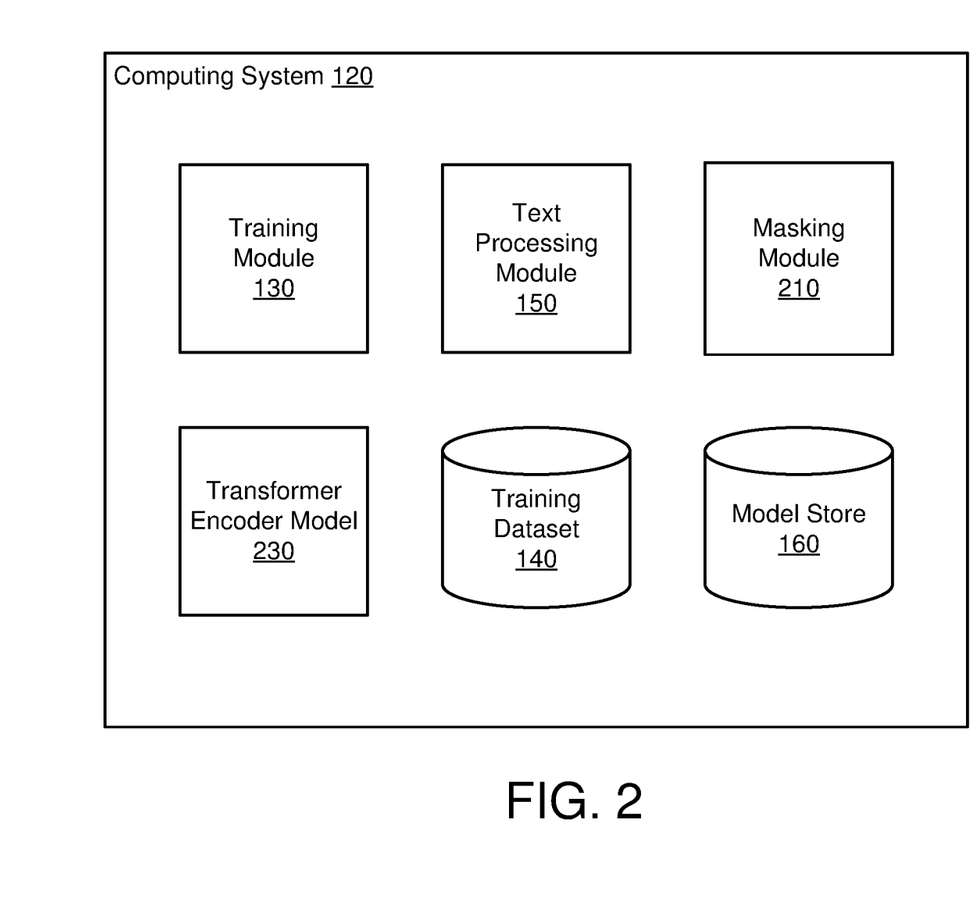
FIG. 2 is a block diagram illustrating components of a computing system for training of a transformer encoder model, according to one embodiment.

FIG. 2 is a block diagram illustrating components of a computing system for pretraining of a transformer encoder model, according to one embodiment. The computing system 120 comprises the training module 130, the training dataset 140, the text processing module 150, the model store 160, a masking module 210, and a transformer encoder model 230. Other embodiments may include different and/or other components than the ones described here, and that the functionalities can be distributed among the components in a different manner. Various modules including the training module 130, the training dataset 140, the text processing module 150, the model store 160 are described in connection with FIG. 1.

The transformer encoder model 230 is configured to receive input data, for example, a text sequence and generate a feature representation of the input data. Although embodiments disclosed herein are described in the context of a transformer encoder model, various techniques are applicable to other types of machine learning based models, for example, machine learning based models that process documents or other types of data, for example, image data or audio data.

The masking module 210 generates masked text sequences from text sequences by replacing one or more tokens of a text sequence with a masked token. A masked token is a special token, for example, "[MASK]" that represents masked data. In an embodiment, each token may be represented using a numeric value, for example, an integer and the masked token corresponds to a specific numeric value such as 0.

The vocabulary of the sentences may be represented by a set of words representing all possible words. Each word is represented by a token. The vocabulary may be several thousand words, for example, more than 30,000 words. The same masked token is used for replacing various tokens of a text sequence and for multiple text sequences of the training dataset 140. The masking module 210 is invoked by the training module 130 for generating masked text sequences for providing as input to the transformer encoder model 230 for training.

Processes

FIGS. 3-7 are flow charts illustrating various processes for pretraining of the transformer encoder model 230. Other embodiments may perform the steps of the processes illustrated in the flowcharts in different order than those indicated in the flowcharts. Other embodiments can include different and/or additional steps than the ones described herein. Although the processes are described herein in connection with the transformer encoder model 230, these processes can be applied to other machine learning based models.

In some embodiments, the training process of the transformer encoder model 230 is a pretraining process. Accordingly, the pretrained transformer encoder model 230 is further trained for specific text processing tasks.

Figure 3:
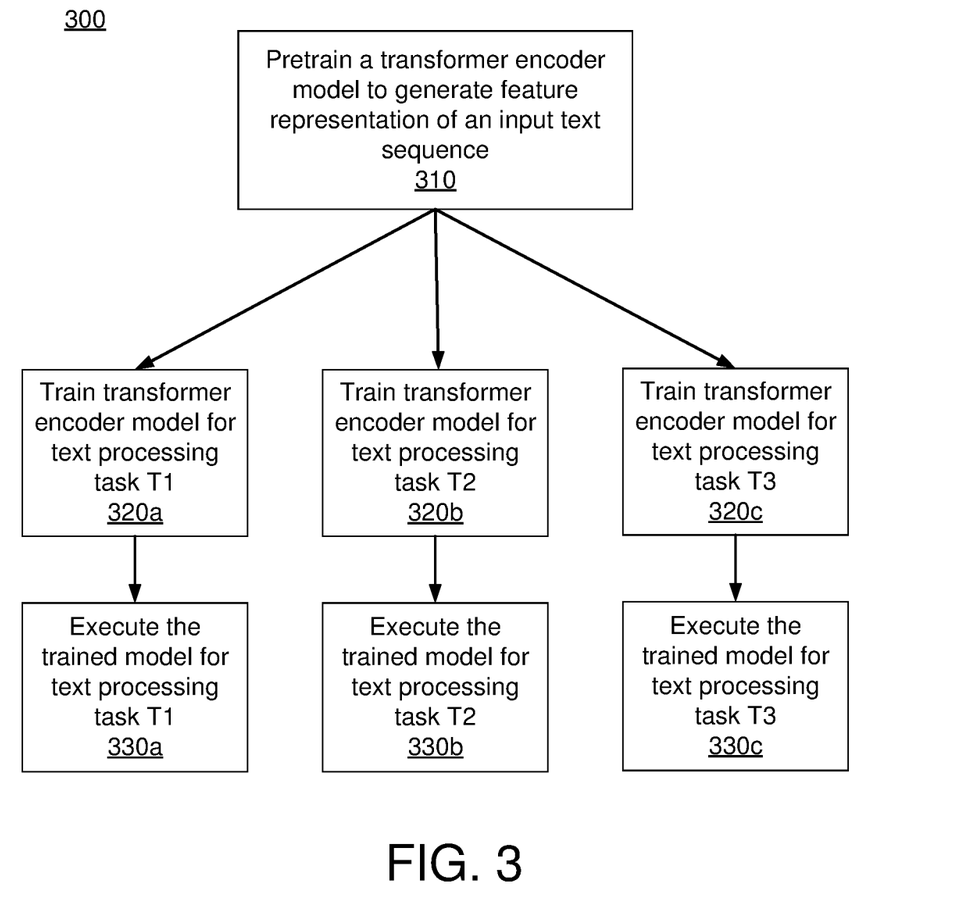
FIG. 3 is a flow chart illustrating the process of using a transformer encoder for various text processing tasks according to an embodiment.

FIG. 3 is a flow chart illustrating the process of using a transformer encoder model 230 for various text processing tasks according to an embodiment. The training module 130 pretrains 310 the transformer encoder model 230 to generate a feature representation of an input text sequence. The pretraining 310 may be performed using a training dataset D1 obtained by combining training data from various text processing domains. The pretrained transformer encoder model 230 may be further trained for use in connection with a specific type of text processing task.

As shown in FIG. 3, the pretrained transformer encoder model 230 is trained 320a, 320b, 330c further for one or more specific text processing tasks. The training 320 for a specific task is performed using a training dataset D2 that may be specific to that text processing task. The training 320 causes the parameters of the transformer encoder model 230 to be further adjusted. The trained transformer encoder model 230 is provided for use by one or more systems that execute 330 the trained model for the text processing task.

In one embodiment, the transformer encoder model 230 is further trained 320 to perform sentiment analysis. Accordingly, the transformer encoder model 230 is further trained for use in predicting the sentiment of a natural language sentence, for example, a sentiment such as negative sentiment, neutral sentiment, or positive sentiment. The transformer encoder model 230 is used for generating a feature representation that is provided as input to a sentiment predicting model.

In one embodiment, the transformer encoder model 230 is further trained 320 for use in conversation engines, for example, chatbots. Accordingly, the transformer encoder model 230 is further trained for use in answering questions. The transformer encoder model 230 is used for generating a feature representation that is provided as input to an answer prediction model. For example, given a question and a set of possible answers, the answer prediction model is used for selecting the correct answer.

In one embodiment, the transformer encoder model 230 is further trained 320 for use in named entity recognition for natural language processing. Accordingly, the transformer encoder model 230 is further trained to generate features used by a natural language processing model configured to receive a sequence of words which may represent names of things. The natural language processing model is configured to label words from the input sequence. A label may identify a word as a person, a company name, a place, or gene and protein name.

In one embodiment, the transformer encoder model 230 is further trained 320 for use in determining sentence similarity for natural language processing. Accordingly, the transformer encoder model 230 is further trained to generate features used by a natural language processing model configured to receive two sentences and predict the similarity of the two sentences. The natural language processing model may be utilized for tasks such as paraphrase detection.

Figure 4:
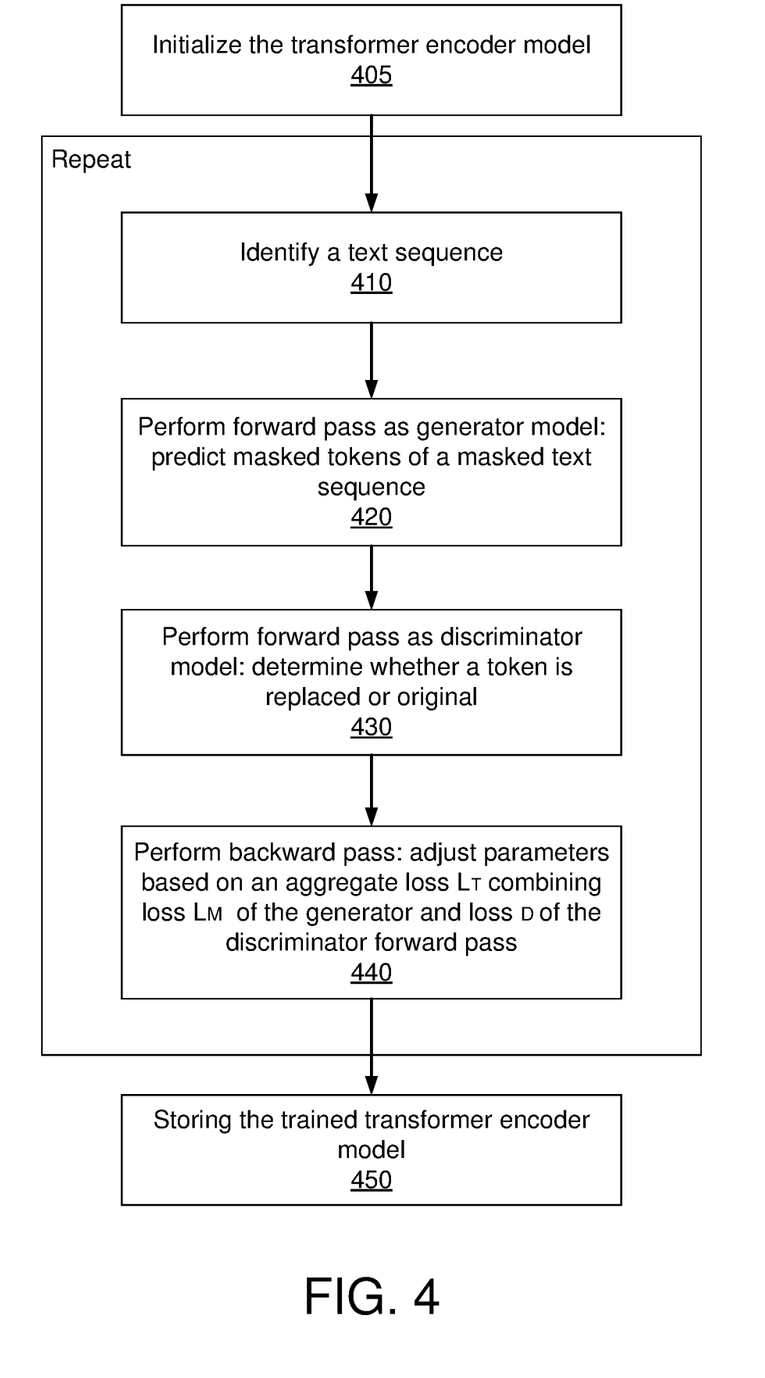
FIG. 4 is a flow chart illustrating the process of training a transformer encoder according to an embodiment.

Details of the process of training the transformer encoder model are further described herein. FIG. 4 is a flow chart illustrating the process of training a transformer encoder according to an embodiment. The transformer encoder model 230 comprises a set of parameters. The training module 130 initializes the transformer encoder model 230 by setting values of the parameters, for example, using randomly generated values. The training process repeats the steps 410, 420, 430, and 440 multiple times, for example, once for each text sequence in a training dataset. The training module 130 receives 410 a text sequence from the training dataset. For example, the text sequence may represent a natural language sentence. The text sequence may comprise a plurality of tokens, each token representing a word of the natural language sentence.

The training module 130 performs 420 a forward pass that treats the transformer encoder model 230 as a generator. This pass may also be referred to as the generator pass. In the forward pass 420, the training module 130 generates a masked text sequence by replacing each of one or more tokens of an input text sequence with a masked token. The training module 130 executes the transformer encoder model 230 to predict the original token that was replaced to obtain a masked token of the masked text sequence.

The training module 130 further performs 430 a forward pass treating the transformer encoder model 230 as a discriminator. This pass may also be referred to as the discriminator pass. The training module 130 generates a predicted text sequence by replacing masked tokens of the masked text sequence with tokens predicted by the transformer encoder model 230. The training module 130 uses the transformer encoder model 230 as a classifier to discriminate between replaced tokens of the predicted text sequence and original tokens of the input text sequence. In one iteration, for both forward passes, i.e., generator pass 420 and the discriminator pass 430, the transformer encoder model uses identical model parameters. Accordingly, the same model with same set of parameters is used for generating the predicted text sequence and then as a classifier for discriminating between replaced tokens and original tokens. The model in the two phases may be padded with values, for example, an additional row for achieving the respective task for the pass. However, the remaining parameters other than the padding are identical for the two passes.

The training module 130 performs 440 a backward pass in which the training module 130 adjusts the set of parameters of the transformer encoder model 230 based on an accuracy of prediction of masked tokens and an accuracy of classification of tokens using the machine learning based model.

The training module 130 stores 450 the trained transformer encoder model 230. The training module 130 may provide the trained transformer encoder model 230 to other systems for execution. The training module 130 may further train 320 the transformer encoder model as shown in FIG. 3 for use in specific text processing tasks.

Figure 6:
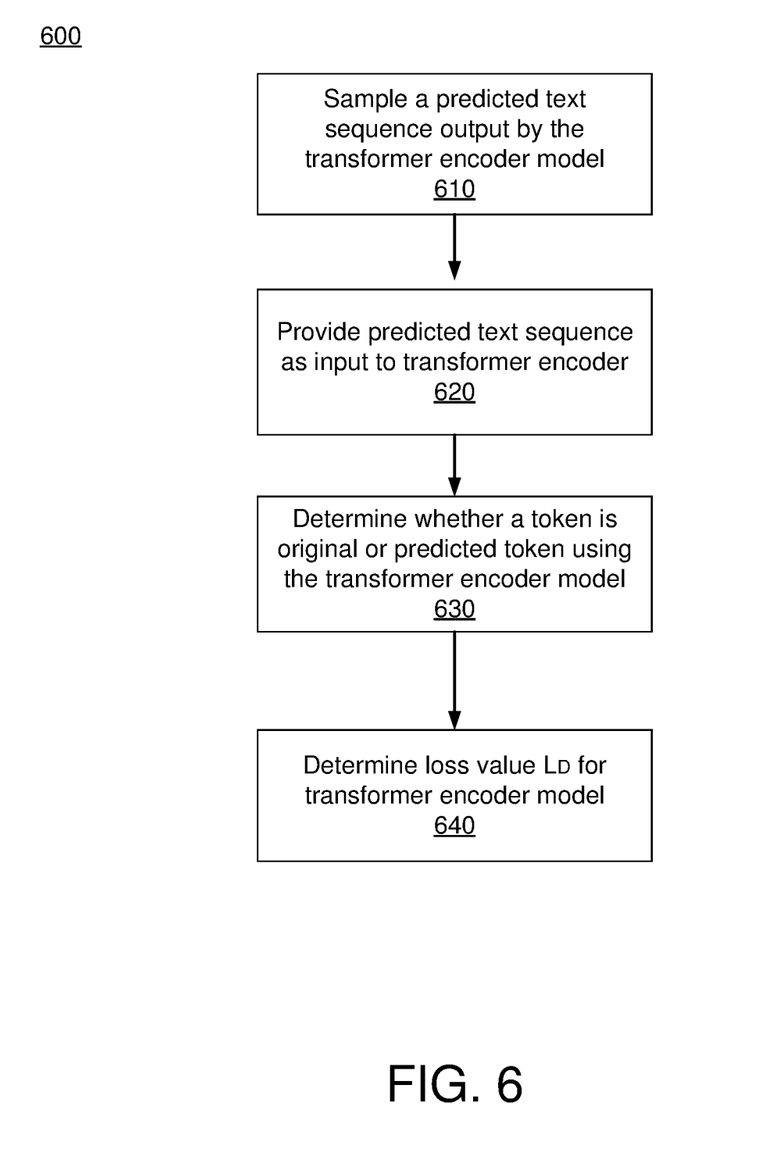
FIG. 6 illustrates the forward pass of a discriminator phase according to an embodiment.
Figure 7:
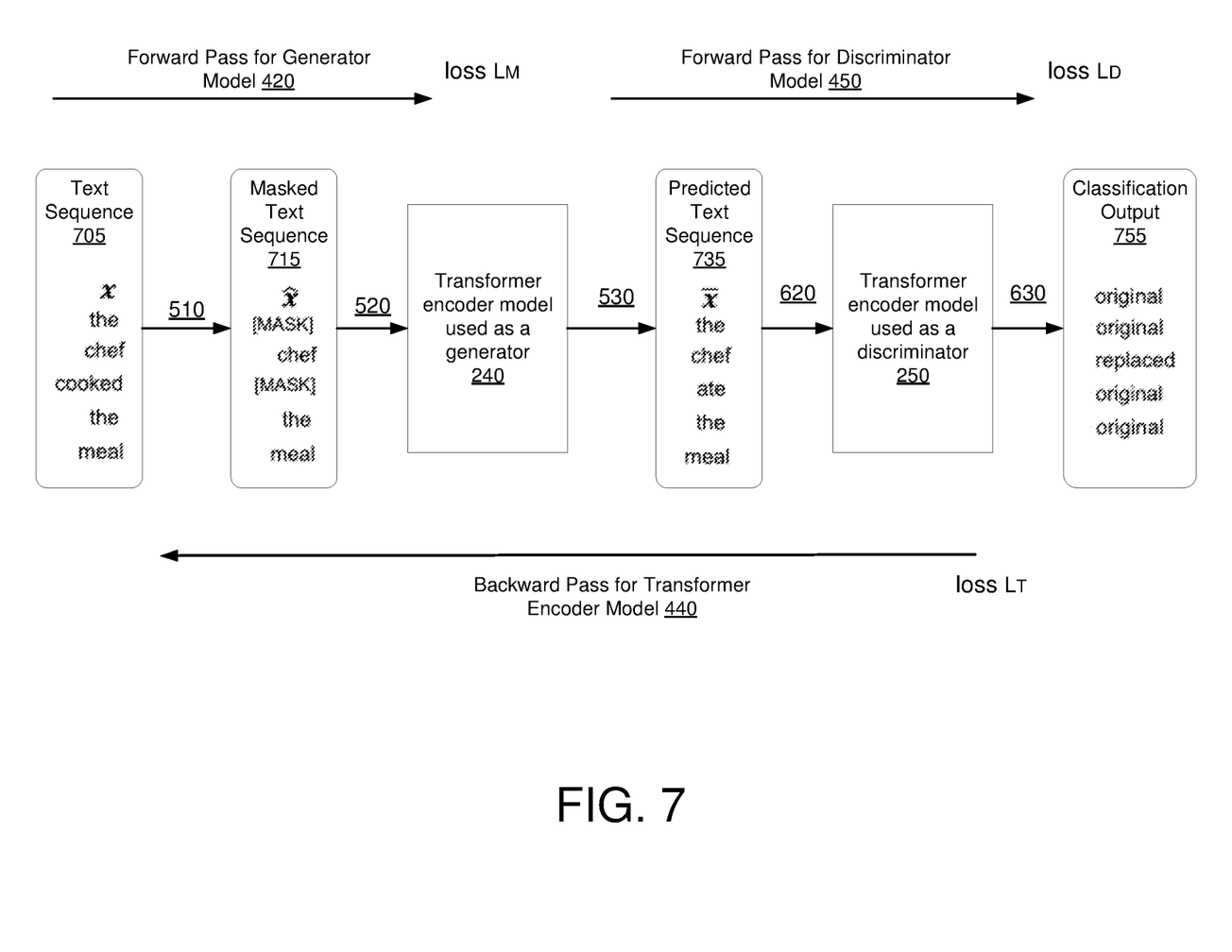
FIG. 7 illustrates the overall process of training a transformer encoder according to an embodiment.

FIG. 7 illustrates the overall process of training a transformer encoder according to an embodiment. The steps of processes illustrated in FIGS. 5 and 6 are illustrated in FIG. 7 and described in connection with FIG. 7.

Figure 5:
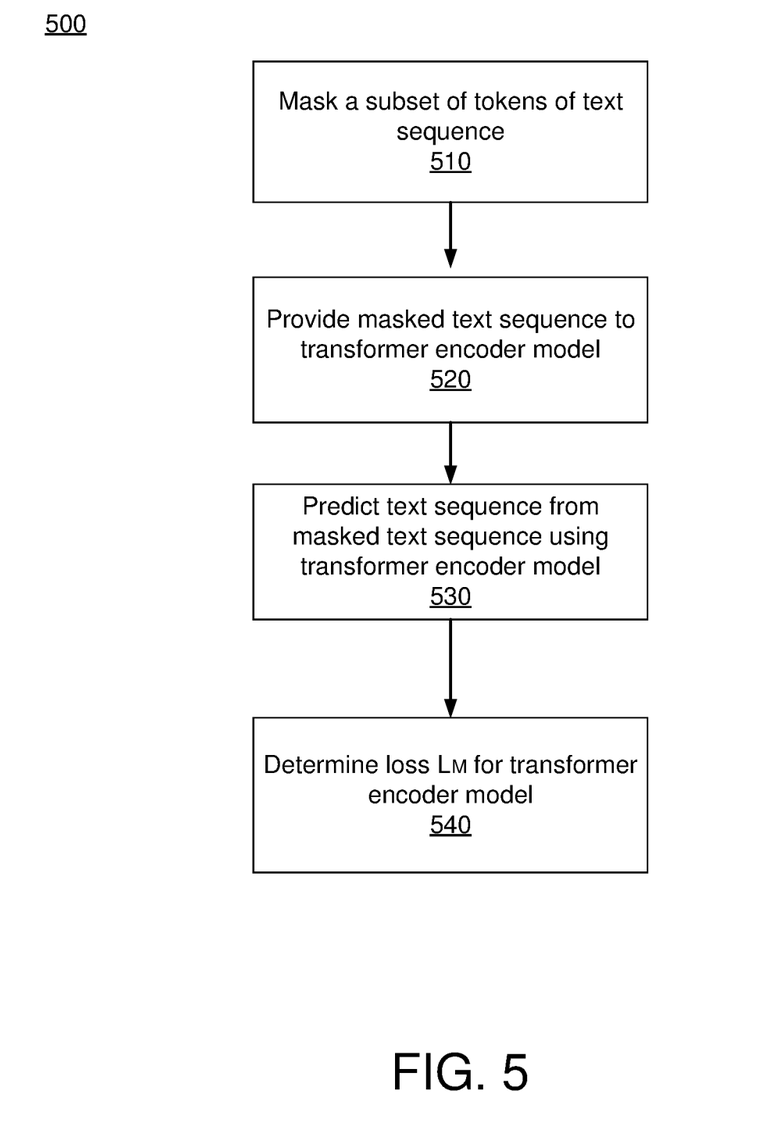
FIG. 5 illustrates the forward pass of a generator phase according to an embodiment.

FIG. 5 illustrates the forward pass of a generator phase according to an embodiment. FIG. 7 shows an example of the selected text sequence as x="the chef cooked the meal". The masking module 210 masks 510 the selected text sequence by replacing each token from a subset of tokens of the text sequence with the masked token. In an embodiment, the masking module 210 replaces a small set of randomly selected words (for example, 15% of the words) of the selected text sequence with the masked token. FIG. 7 shows an example of the selected text sequence as $\hat{x}$="[MASK] chef [MASK] the meal".

The training module 130 provides 520 the masked text sequence as input to the transformer encoder model 230. The transformer encoder model 230 is executed to predict 530 the original tokens of the text sequence from the masked text sequence. A predicted text sequence 735 is generated based on the predictions of the masked tokens. In an embodiment, the training module 130 executes the transformer encoder model 230 to determine, for each word in the sentence $\hat{x}$, the probabilities of each of the words in the vocabulary. Accordingly, for a masked token, the transformer encoder model 230 predicts the likelihood that the masked token of the text sequence was a particular word from the vocabulary. Accordingly, the training module 130 generates a distribution over words in the vocabulary. In this step, the transformer encoder model 230 acts as a generator as it generates possible candidates for masked out tokens in $\hat{x}$.

The training module 130 determines a loss $L_M$ based on a comparison of the predicted text sequence and the input text sequence 705. In an embodiment, the loss $L_M$ represents the log likelihood of predicting the correct word for all masked out words of the text sequence. The loss $L_M$ is determined using the following equations.

$$\log p_\theta(x|\hat{x}) = \sum_{t=1}^{T} m_t \log p_\theta(x_t|\hat{x}) \quad (1)$$

$$= \sum_{t=1}^{T} m_t \log \frac{\exp(s_{tv})}{\sum_{v'=1}^{V} \exp(s_{tv'})} \quad (2)$$

In this equation, $x=[x_1, \ldots, x_t, \ldots x_T]$ represents the input text sequence, $x_t$ is the $t^{th}$ token of the text sequence x, $\hat{x}$ is the masked text sequence, $m_t \in \{0,1\}$ indicates whether the $t^{th}$ token is masked, V is the vocabulary size, and $W \in \mathbb{R}^{V \times d}$ is the weight matrix of a softmax layer of the transformer encoder model. The logit or score for the $t^{th}$ token is $s_t = W_{e_t} \in$ $\mathbb{R}^V$. The loss $L_M$ is determined as $L_M(\theta)=-\mathbb{E}_{p_{data}(x)} \log p_\theta(x|\hat{x})$ where $p_{data}$ is the empirical data distribution. FIG. 6 illustrates the forward pass of a discriminator phase according to an embodiment. The training module 130 samples 610 a predicted text sequence output by the transformer encoder model 230. For the masked text sequence $\hat{x}$, the training module replaces the masked tokens with words that seem likely given the other words of the sentence. These words may be different from the original token that was replaced with the masked token. For example, as shown in FIG. 7, the word "cooked" in the text sequence 705 is replaced with "ate" in the predicted text sequence 735. In an embodiment, the training module uses $\mathcal{P}\,\theta(x_t|\hat{x})$ as a conditional distribution of $x_t$ to construct a sampled sequence $\bar{x}=[\bar{x}_1, \ldots, \bar{x}_T]$ by replacing $x_t$ with $\bar{x}_t$, a token sampled from distribution $\mathcal{P}\,\theta(x_t|\hat{x})$.

The training module 130 determines the distribution over possible candidate words for all masked tokens. For each masked token, the training module samples from this discrete distribution to obtain a reasonable replacement word. The training module generates a sampled sentence $\bar{x}$.

The training module 130 samples a replacement token from a Gumbel-Softmax distribution. In an embodiment, the system uses a sampling method based on Gumbel-softmax as represented using equation (3) below. Other embodiments can use other sampling methods for discrete distributions. The training module 130 replaces the token $x_t$ if it is masked in $\hat{x}$, i.e., $m_t=1$. The training module 130 uses the following equation to determine the probability of sampling the $v^{th}$ token in the vocabulary for $x_t$.

$$p(\bar{x}_t|\hat{x}) = \frac{\exp[(\log\pi_v + g_v)/\tau]}{\sum_{v'=1}^{V} \exp[(\log\pi_{v'} + g_{v'})/\tau]} \quad (3)$$

In this equation, $\pi=\{\pi_v\}_{v=1}^V$ denotes $P\theta(x_t|\hat{x})$ denotes for notational convenience, $\{g_{v'}\}_{v'=1}^V$ represents independent and identically distributed (IID) samples drawn from a Gumbel-softmax distribution Gumbel (0, 1) and $\tau$ is a parameter representing a temperature for sampling. The Gumbel-softmax distribution $\pi$ approaches one-hot when $\tau$ is small, for example, $\tau=0.1$. The Gumbel-softmax distribution $\pi$ approaches uniform distribution when $\tau$ is large, for example, $\tau=10.0$.

The training module 130 provides the predicted text sequence as input to the transformer encoder for using the transformer encoder model 230 as a discriminator or a classifier.

As a discriminator, the transformer encoder model 230 determines 630 whether a token in the predicted text sequence 635 is an original token or a replaced token based on the prediction of the transformer encoder model 230. Accordingly, the transformer encoder model 230 acts as a binary classifier to generate a classification output 755 that predicts whether a token is original or replaced.

The training module 130 determines a loss $L_D$ based on an accuracy of classification of transformer encoder model 230. The accuracy of classification of the transformer encoder model 230 is determined by comparing the classification output against a result of a comparison of the predicted text sequence and the input text sequence 705.

The value $\bar{x}_t$ is considered as a positive token if $\bar{x}_t=x_t$ and $\bar{x}_t$ is considered as a negative token if $\bar{x}_t \neq x_t$. In the generator phase, the last layer of the transformer encoder defines a classifier based on V classes using the parameters W. The system may augment W to generate an augmented matrix W+ with an extra row for computing the score or logit for the negative token class, making it classify V+1 classes. In an embodiment, the system fixes the last row of W+ to all zeros. The logit for token t is determined using following equation.

$$s_t^+ = W^+e_t = \begin{cases} W_{e_t} = s_t, \text{ for } t = \{1, \ldots, V\} \\ 0, \text{ otherwise} \end{cases}.$$

Since the transformer encoder model used as a generator is also used as a discriminator, the transformer encoder model outputs as many probabilities for each word in the sentence $\bar{x}$ as the size of the vocabulary V. The discriminator task is a binary classification, that is, the system detects whether a token in $\bar{x}$ is either original or replaced. To reduce the number of probabilities from the size of the vocabulary V (which could be several thousands of words) to 2 probabilities for binary classification, the system computes the summation over the probabilities as in equations (4) and (5) below. The probability of token t in $\bar{x}$ being negative is represented using the following equation.

$$p(t^-|\bar{x}) = \frac{1}{\sum_{v'=1}^{V} \exp(s_{tv'}) + 1} \quad (4)$$

The probability of token t in $\bar{x}$ being positive is represented using the following equation.

$$p(t^+|\bar{x}) = \frac{\sum_{v'=1}^{V} \exp(s_{tv'})}{\sum_{v'=1}^{V} \exp(s_{tv'}) + 1} \quad (5)$$

Here, the values $t^-$ and $t^+$ indicate that $\bar{x}_t$ is a positive token or negative token respectively.

The loss $L_D$ of the discriminator phase is determined as the cross entropy loss determined using the following equation.

The overall loss value $L_T$ used for adjusting parameters of the transformer encoder model is determined as $L_T=L_M(\theta)+\alpha L_D(\theta)$, where $\alpha$ is a coefficient determining the strength of discriminative training.

For each of the two loss terms $L_M$ and $L_D$ the gradients with respect to the model parameters (or weights $\theta$) are determined and an update on the parameters $\theta$ is performed to adjust the parameters. The training module thus uses a single model to learn jointly from both (1) the generator phase, which predicts the correct word for a masked token, and, (2) the discriminator phase, which predicts whether a word is original or has been replaced.

Performance Improvement

The performance of the transformer encoder model was evaluated against a natural language understanding benchmark referred to as General Language Understanding Evaluation (GLUE) benchmark and against a Stanford Question Answering Dataset (SQuAD) benchmark used for question answering. The comparison indicated improvement compared to conventional techniques for achieving comparable natural language processing tasks.

Figure 8:
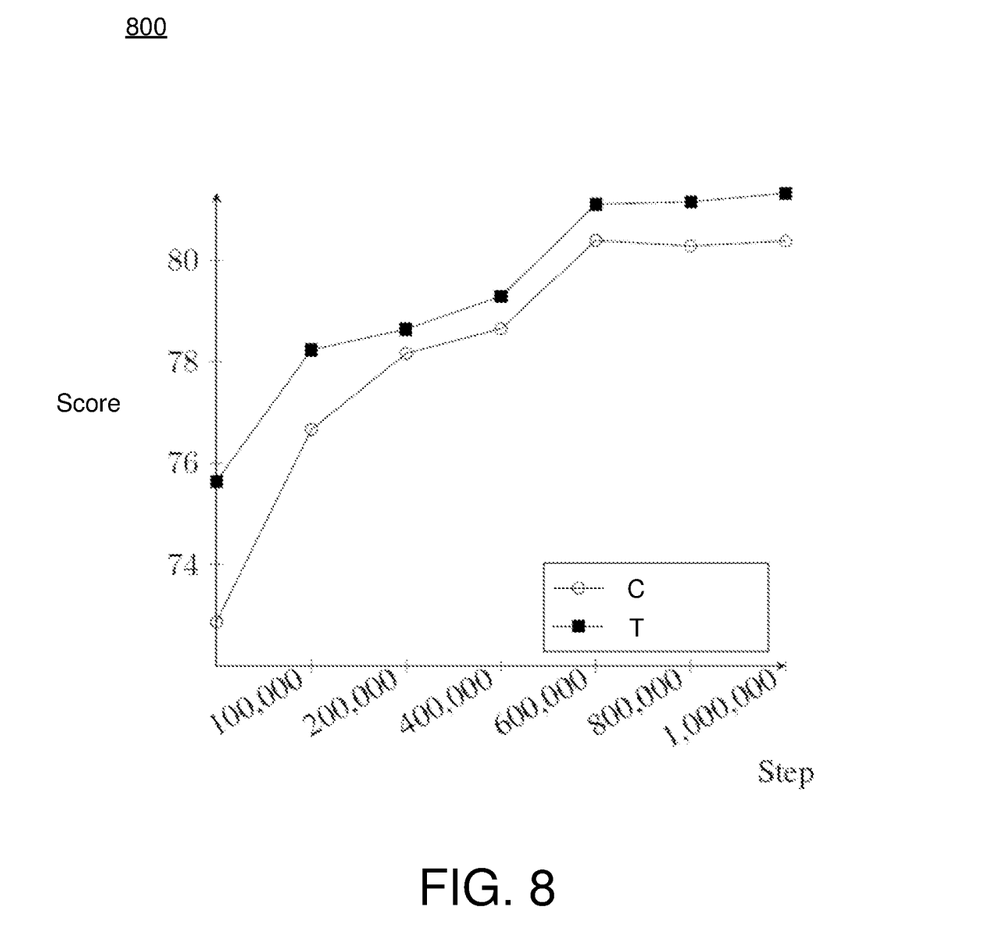
FIG. 8 shows illustrates improvement in performance obtained by using the transformer encoder model according to an embodiment.

FIG. 8 shows illustrates improvement in performance obtained by using the transformer encoder model according to an embodiment. The existing technique is marked C in the graph 800 and the transformer encoder is marked as T. The existing technique uses an existing pre-training method. The x-axis of the graph shows the number of training steps and the y-axis shows a score indicating performance of the techniques. The GLUE benchmark covers a diverse range of problems or tasks in natural language processing. The GLUE score is an average over the scores of these tasks. The task include CoLA (determining whether a sentence grammatically correct), SST (determining sentiment of a movie review), MRPC (determining whether sentence A is a paraphrase of sentence B?), STS (determining how similar are two given sentences?), QQP (determining whether sentence A entail or contradict sentence B?), QNLI (Does sentence B contain the answer to the question in sentence A?), RTE (determining whether sentence A entails sentence B?), WNLI (if sentence B replaces sentence A's ambiguous pronoun with one of the nouns—determining if this is the correct noun.)

The graph 800 shows that the transformer encoder achieves overall improved performance compared to an existing technique. The transformer encoder achieves higher sample efficiency compared to existing techniques indicating that the amount of training data required for training the transformer encoder mode is less than existing techniques for achieving comparable performance. Furthermore, for comparable training dataset sizes used for training models, the transformer encoder model achieves improved performance on various downstream tasks performed using a pretrained model. Accordingly, the disclosed techniques improve the performance of the training process by requiring less computational resources during training of the model. The improved performance is indicated by higher accuracy of predictions of models using representation learning based on the transformer encoder.

Computer Architecture

Figure 9:
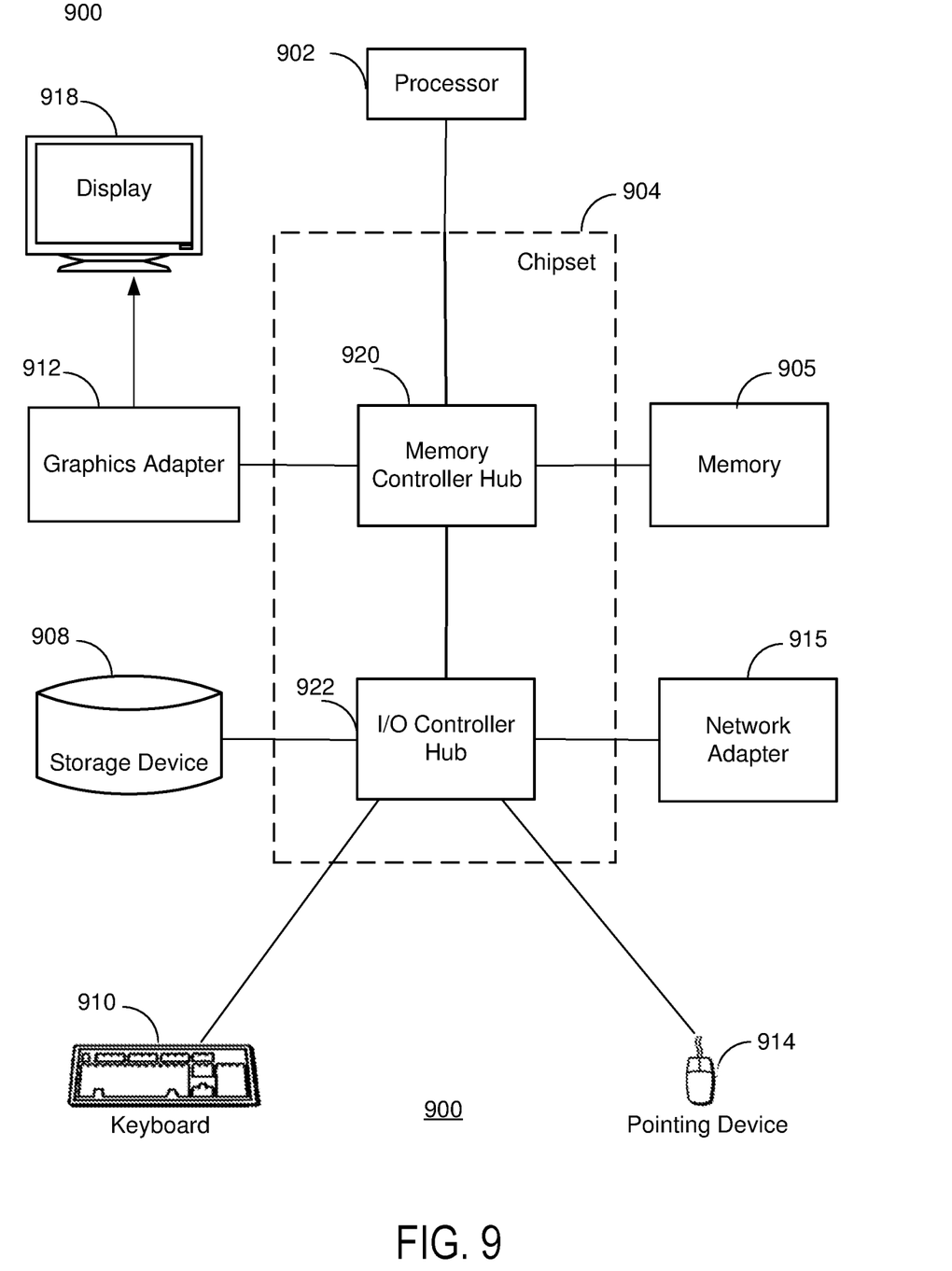
FIG. 9 is a block diagram illustrating a functional view of a typical computer system according to one embodiment.

FIG. 9 is a high-level block diagram illustrating a functional view of a typical computer system for use as one of the entities illustrated in the environment 100 of FIG. 1 according to an embodiment. Illustrated are at least one processor 902 coupled to a chipset 904. Also coupled to the chipset 904 are a memory 906, a storage device 908, a keyboard 910, a graphics adapter 912, a pointing device 914, and a network adapter 916. A display 918 is coupled to the graphics adapter 912. In one embodiment, the functionality of the chipset 904 is provided by a memory controller hub 920 and an I/O controller hub 922. In another embodiment, the memory 906 is coupled directly to the processor 902 instead of the chipset 904.

The storage device 908 is a non-transitory computer-readable storage medium, such as a hard drive, compact disk read-only memory (CD-ROM), DVD, or a solid-state memory device. The memory 906 holds instructions and data used by the processor 902. The pointing device 914 may be a mouse, track ball, or other type of pointing device, and is used in combination with the keyboard 910 to input data into the computer system 900. The graphics adapter 912 displays images and other information on the display 918. The network adapter 916 couples the computer system 900 to a network.

As is known in the art, a computer 900 can have different and/or other components than those shown in FIG. 9. In addition, the computer 900 can lack certain illustrated components. For example, a computer system 900 acting as a multi-tenant system 120 may lack a keyboard 910 and a pointing device 914. Moreover, the storage device 908 can be local and/or remote from the computer 900 (such as embodied within a storage area network (SAN)).

The computer 900 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 908, loaded into the memory 906, and executed by the processor 902.

The types of computer systems 900 used by the entities of FIG. 1 can vary depending upon the embodiment and the processing power used by the entity. For example, a client device 115 may be a mobile phone with limited processing power, a small display 918, and may lack a pointing device 914. The multi-tenant system 120, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method for training a machine learning based model, the method comprising:
    initializing the machine learning based model comprising a set of parameters;
    training the machine learning based model by repeatedly performing:
        generating a masked text sequence by replacing a token of an input text sequence with a masked token, for one or more tokens of the input text sequence;
        predicting one or more masked tokens of the masked text sequence using the machine learning based model;
        generating a predicted text sequence by replacing masked tokens of the masked text sequence with tokens predicted by the machine learning based model;
        using the machine learning based model as a classifier to discriminate between replaced tokens of the predicted text sequence and original tokens of the input text sequence; and
        adjusting the set of parameters of the machine learning based model based on an accuracy of prediction of masked tokens and an accuracy of classification of tokens using the machine learning based model; and
    storing the trained machine learning based model.

2. The method of claim 1, wherein the machine learning based model is a transformer encoder model.

3. The method of claim 1, wherein adjusting the set of parameters is based on an aggregate loss obtained by combining:
    (1) a generator loss indicative of accuracy of prediction of masked tokens by the machine learning based model, and
    (2) a discriminator loss indicative of an accuracy of classification of tokens using the machine learning based model.

4. The method of claim 3, wherein the generator loss is determined based on a comparison of tokens predicted by the machine learning based model with corresponding tokens of the input text sequence.

5. The method of claim 3, wherein the discriminator loss is determined by verifying the result of classification performed using the machine learning based model by comparing tokens of the predicted text sequence with the input text sequence.

6. The method of claim 1, wherein the training is pre-training using a first training dataset, the method further comprising:
    further training the pretrained machine learning based model using a second training dataset for one or more text processing tasks.

7. The method of claim 6, wherein the one or more text processing tasks comprise:
    sentiment analysis of natural language sentences;
    given a question, determining an answer for the question;
    performing named entity recognition in a text; or
    determining whether two sentences are similar.

8. The method of claim 1, wherein a text sequence is based on a vocabulary, wherein obtaining the predicted text sequence by replacing masked tokens of the masked text sequence with tokens predicted by the machine learning based model comprises:
    predicting a plurality of predicted text sequences based on candidate tokens predicted for each masked token; and
    sampling the predicted text sequence from the plurality of predicted text sequences.

9. A non-transitory computer readable storage medium storing instructions that when executed by a computer processor, cause the computer processor to perform steps comprising:
    initializing a machine learning based model comprising a set of parameters;
    training the machine learning based model by repeatedly performing:
        generating a masked text sequence by replacing a token of an input text sequence with a masked token, for one or more tokens of the input text sequence;
        predicting one or more masked tokens of the masked text sequence using the machine learning based model;
        generating a predicted text sequence by replacing masked tokens of the masked text sequence with tokens predicted by the machine learning based model;

using the machine learning based model as a classifier to discriminate between replaced tokens of the predicted text sequence and original tokens of the input text sequence; and adjusting the set of parameters of the machine learning based model based on an accuracy of prediction of masked tokens and an accuracy of classification of tokens using the machine learning based model; and storing the trained machine learning based model.

10. The non-transitory computer readable storage medium of claim 9, wherein the machine learning based model is a transformer encoder model.

11. The non-transitory computer readable storage medium of claim 9, wherein adjusting the set of parameters is based on an aggregate loss obtained by combining:
(1) a generator loss indicative of accuracy of prediction of masked tokens by the machine learning based model, and
(2) a discriminator loss indicative of an accuracy of classification of tokens using the machine learning based model.

12. The non-transitory computer readable storage medium of claim 11, wherein the generator loss is determined based on a comparison of tokens predicted by the machine learning based model with corresponding tokens of the input text sequence.

13. The non-transitory computer readable storage medium of claim 11, wherein the discriminator loss is determined by verifying the result of classification performed using the machine learning based model by comparing tokens of the predicted text sequence with the input text sequence.

14. The non-transitory computer readable storage medium of claim 9, wherein the training is pretraining using a first training dataset, wherein the instructions further cause the computer processor to perform steps comprising:
further training the pretrained machine learning based model using a second training dataset for one or more text processing tasks.

15. The non-transitory computer readable storage medium of claim 14, wherein the one or more text processing tasks comprise:
sentiment analysis of natural language sentences;
given a question, determining an answer for the question;
performing named entity recognition in a text; or
determining whether two sentences are similar.

16. The non-transitory computer readable storage medium of claim 9, wherein a text sequence is based on a vocabulary, wherein obtaining the predicted text sequence by replacing masked tokens of the masked text sequence with tokens predicted by the machine learning based model comprises:
predicting a plurality of predicted text sequences based on candidate tokens predicted for each masked token; and
sampling the predicted text sequence from the plurality of predicted text sequences.

17. A computer system comprising:
a computer processor; and
a non-transitory computer readable storage medium storing instructions that when executed by the computer processor cause the computer processor to perform steps comprising:
initializing a machine learning based model comprising a set of parameters;
training the machine learning based model by repeatedly performing:
generating a masked text sequence by replacing a token of an input text sequence with a masked token, for one or more tokens of the input text sequence;
predicting one or more masked tokens of the masked text sequence using the machine learning based model;
generating a predicted text sequence by replacing masked tokens of the masked text sequence with tokens predicted by the machine learning based model;
using the machine learning based model as a classifier to discriminate between replaced tokens of the predicted text sequence and original tokens of the input text sequence; and
adjusting the set of parameters of the machine learning based model based on an accuracy of prediction of masked tokens and an accuracy of classification of tokens using the machine learning based model; and
storing the trained machine learning based model.

18. The computer system of claim 17, wherein the training is pretraining using a first training dataset, wherein the instructions further cause the computer processor to perform steps comprising:
further training the pretrained machine learning based model using a second training dataset for one or more text processing tasks.

19. The computer system of claim 18, wherein the one or more text processing tasks comprise:
sentiment analysis of natural language sentences;
given a question, determining an answer for the question;
performing named entity recognition in a text; or
determining whether two sentences are similar.

20. The computer system of claim 17, wherein a text sequence is based on a vocabulary, wherein obtaining the predicted text sequence by replacing masked tokens of the masked text sequence with tokens predicted by the machine learning based model comprises:
predicting a plurality of predicted text sequences based on candidate tokens predicted for each masked token; and
sampling the predicted text sequence from the plurality of predicted text sequences.

* * * * *